United States Patent

Witjes

[19]

[11] Patent Number: 6,148,706
[45] Date of Patent: *Nov. 21, 2000

[54] DEVICE FOR SHORTENING TRANSLUCENT MULTILATERAL PLATE MATERIAL

[75] Inventor: Eric Bernardus Wilhelmus Witjes, Ede, Netherlands

[73] Assignee: Concin S.A., Luxembourg

[*] Notice: This patent issued on a continued prosecution application filed under 37 CFR 1.53(d), and is subject to the twenty year patent term provisions of 35 U.S.C. 154(a)(2).

[21] Appl. No.: 08/794,751

[22] Filed: Feb. 3, 1997

[30] Foreign Application Priority Data

Feb. 1, 1996 [NL] Netherlands ............................ 1002226

[51] Int. Cl.$^7$ ..................................................... B26D 1/24
[52] U.S. Cl. .................................. 83/495; 83/51; 83/488; 83/614
[58] Field of Search ............................. 83/488, 489, 485, 83/487, 578, 614, 51, 425, 495, 623, 629, 631

[56] References Cited

U.S. PATENT DOCUMENTS

| | | | |
|---|---|---|---|
| 2,664,926 | 1/1954 | Fuglie | 83/489 X |
| 2,746,545 | 5/1956 | Chamberlain | 83/489 |
| 2,777,521 | 1/1957 | Tanis | 83/257 |
| 2,941,560 | 6/1960 | McCaffery | 83/882 |
| 3,340,909 | 9/1967 | Vidal | 83/488 |
| 3,641,854 | 2/1972 | Keesling | 83/578 X |
| 4,294,143 | 10/1981 | Lieberman | 83/37 |
| 4,467,849 | 8/1984 | Denis | 83/488 X |
| 4,614,138 | 9/1986 | Altman | 83/51 |
| 5,001,955 | 3/1991 | Fujiwara | 83/488 |
| 5,179,883 | 1/1993 | Payr | 83/488 X |
| 5,458,034 | 10/1995 | Cavagna | 83/488 |
| 5,503,053 | 4/1996 | Onishi et al. | 83/488 |

FOREIGN PATENT DOCUMENTS

| | | |
|---|---|---|
| 0 044 550 | 1/1982 | European Pat. Off. . |
| 0 330 729 | 9/1989 | European Pat. Off. . |
| 445550 | 11/1912 | France . |
| 2 615 433 | 11/1988 | France . |
| 1 188 250 | 3/1965 | Germany . |
| 3 216 656 | 4/1983 | Germany . |
| 978760 | 12/1964 | United Kingdom . |
| 1128457 | 9/1968 | United Kingdom . |
| 1 277 987 | 6/1972 | United Kingdom . |
| 2 292 903 | 3/1996 | United Kingdom . |

Primary Examiner—Clark F. Dexter
Attorney, Agent, or Firm—Young & Thompson

[57] ABSTRACT

A device for shortening translucent double-walled plate material (20) which shortens the plate material with a substantially rectilinear cut. The plate material comprises two basically parallel synthetic plates (21, 22) which are separated from each other at a basically constant distance by a number of parallel dividing walls, enclosing a number of elongated channels (24). To avoid too much pressure on the plate material, when it is shortened, and to avoid too large an amount of chips and too much electrostatic charging of the plate material the device comprises two rotating knives (4, 5) to work into the plate material (20) from both sides. The rotating knives in accordance with the invention, have been placed slantwise behind each other and their combined penetration equals at least the thickness of the plate material (20) ensuring a complete cut through the plate material.

2 Claims, 3 Drawing Sheets

DEVICE FOR SHORTENING TRANSLUCENT MULTILATERAL PLATE MATERIAL

The invention relates to a device for shortening translucent plate material of at least two basically parallel synthetic plates which have been connected by means of a number of parallel dividing walls, including at the same time a number of elongated channels, which device includes means for shortening plate material with a basically rectilinear cut.

When this type of multilateral plate material is shortened, especially in a direction transverse to the dividing walls, it is important to avoid too much pressure on the material where it is cut, because otherwise the occurring mechanical pressure could cause the walls to deform or even collapse. In case of a known device of the type as referred to in the opening lines, the plate material is sawn to the desired size to realise this. Although the mechanical stress on the plate material is extremely small in this case, a device of this type has the disadvantage that the plate material will become electrostatic as a consequence of the swiftly rotating saw plate, which will attract dirt and dust from the environments Furthermore, some of the chips produced by the sawing, will inevitably end up in the channels of the plate material. The pollution, thus gathered in the channels, will concentrate itself in those spots which have the highest electrostatic charge. Because of this, this pollution, which can be seen from outside in the translucent plate material, is to be removed at a later stage, for example by blowing through each individual channel. Not only is additional handling required, but new polluted outside air is almost inevitably admitted in the channels, which can become a germ for algal or fungal growth or spots of another kind.

For that matter, it should be noted that here the term translucent is to cover all types of plate material which are to a certain extent light transparent and susceptible to the above-mentioned growth of spots. This does not apply to purely transparent material only, but also to opal, milk white or otherwise coloured or treated plate material.

The invention aims at providing an installation as referred to in the opening lines which avoids both an intolerable stress on the plate material and the above-mentioned disadvantages of the known device.

To this end, a device of the type as referred to in the opening lines according to the invention is characterised in that the above-mentioned means include two rotating knives which are to operate on the plate material from both sides in the same plane of intersection, that the rotating knives have been placed slantwise behind each other, that the combined penetration of the rotating knives equals at least the thickness of the plate material and that the rotating knives which have been provided with propellants to enabling the knives to rotate, when in use, with a speed of rotation different from the throughput speed with regard to the plate material. Because the installation uses, in accordance with the invention, knives to cut the plate material, formation of chips is avoided, or limited Lo a minimum. Furthermore, the plate material will, because of the very limited amount of friction with the plate material, when compared with sawing, become considerably less electrostatic and will thus attract less dirt and dust. In accordance with the invention, the sound level and thus the annoyance of the invention will be much lower in practice than when a sawing installation is used. Because the rotating knives have been provided with propellants enabling the knives to rotate, when in use, with a speed of rotation different from the throughput speed used for the- plate material, it is possible to modify the relative speed of the knives with regard to the throughput speed used for the plate material, to the extent desired, to limit their friction, and as a consequence of this, the electrostatic charging of the plate material. All this leads to reduced attraction of dirt and dust particles by the plate material which could eventually negatively influence the translucency of the plate material, To avoid deformation or even collapsing of the plate material and especially of the dividing walls as a consequence of the pressure caused by the rotating knives, the rotating knives have been placed slantwise behind each other on both sides which ensures that the normal forces which the knives, when in use, apply on the plate material do not work against each other on the same line.

Furthermore, the knives promote, while working bilaterally together, a desired bevelled edge on both outer plates of the plate material, without a sharp ridge which could tear up a finishing of the edge, if any, which is usually strip stock.

Because of this, a special version of the device according to the invention is characterised in that the combined penetration of the rotating knives slightly exceeds the thickness of the plate material, and that the knives are slightly separated at their outlines. Because the combined penetration of the knives is, without the risk of damage, set to exceed slightly the thickness of the plate material, a complete cut through the plate material is ensured. To be able to shorten very thick plate material, a special version of the device according to the invention, is characterised in that at least one of both rotating knives can be adjusted in height in a direction transverse to the place of entry. Thus a deep cut can be realised by repeated cuttings, which become deeper with every repetition, without intolerable friction with or pressure on the plate material.

In a practical embodiment the device according to the invention is characterised in that the rotating knives have been installed on a frame, under which a carriage has been placed on a linear guiding system to be able to move them, while, more specifically, the frame has been provided with means of attachment to fix the plate material on it.

The invention will now be discussed in more detail using an example of an embodiment and an accompanying drawing in which.

The drawings are purely schematic and have not been drawn to scale. Especially for reasons of clarity, some dimensions are represented extremely large or small. The corresponding parts in the figures are to the best possible extent indicated with one and the same reference number.

Figure 1:
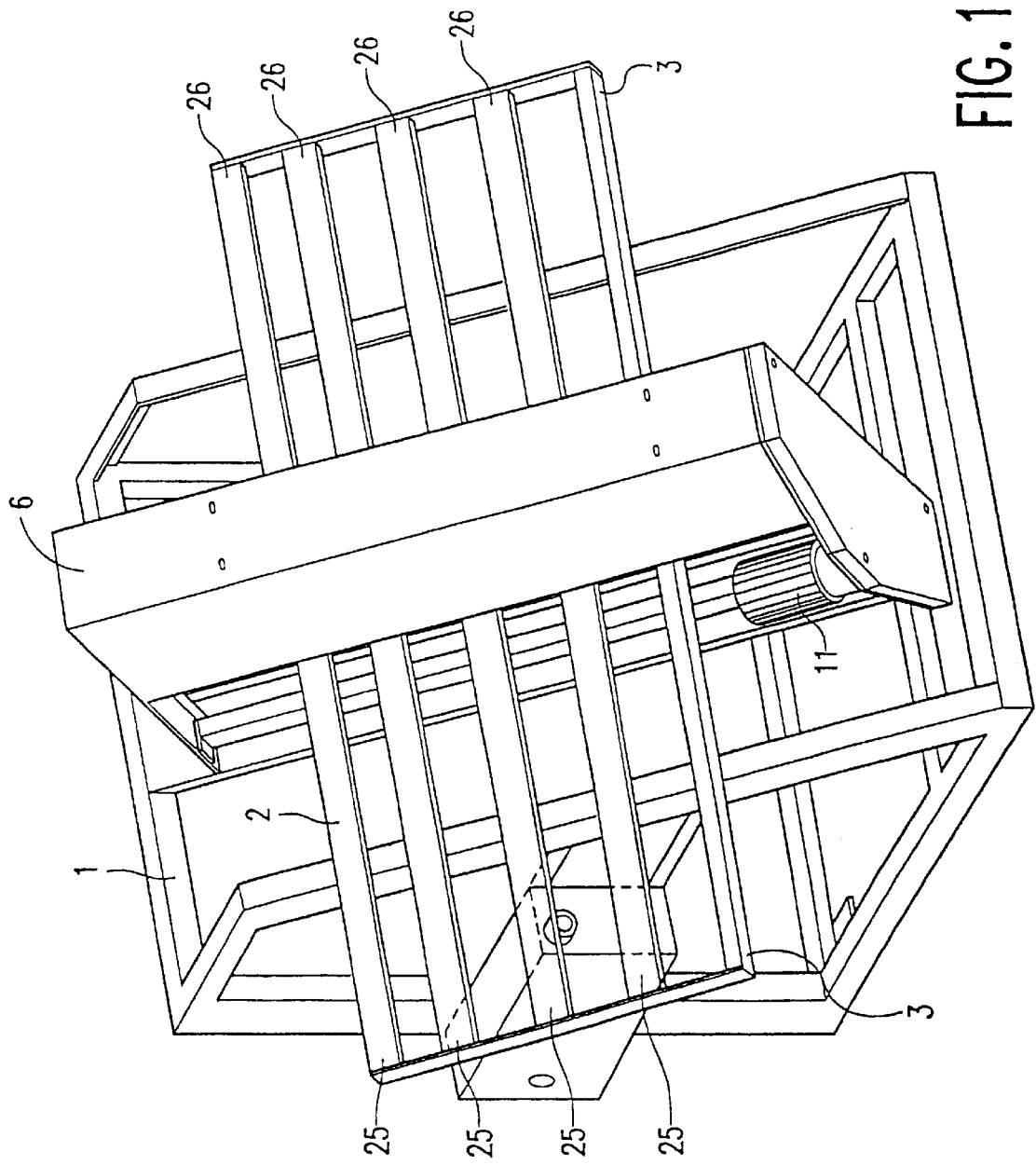
FIG. 1 shows a perspective front view of an embodiment of the device according to the invention.
Figure 2:
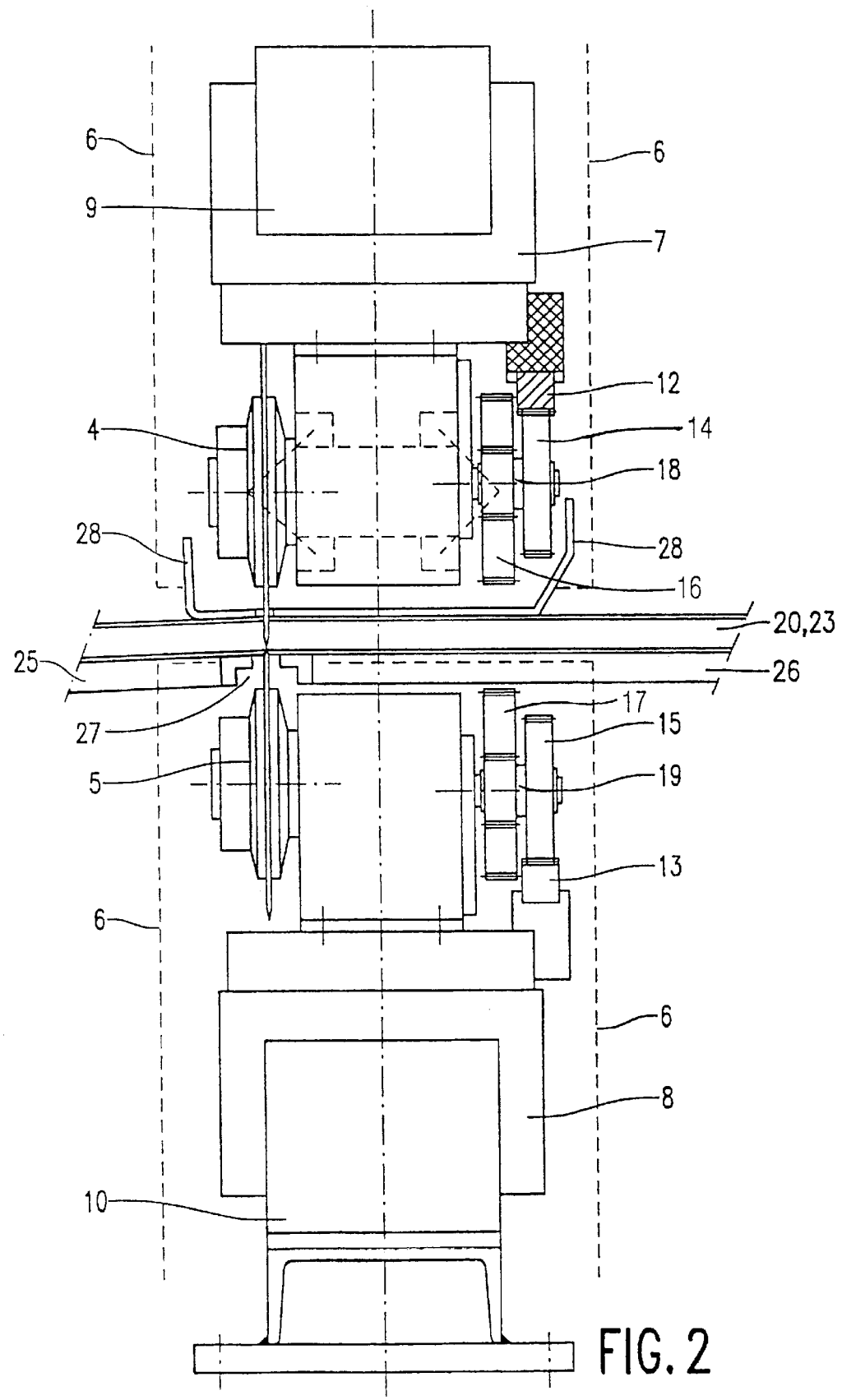
FIG. 2 shows a cross section of the cutting part of the device of FIG. 1.
Figure 3:
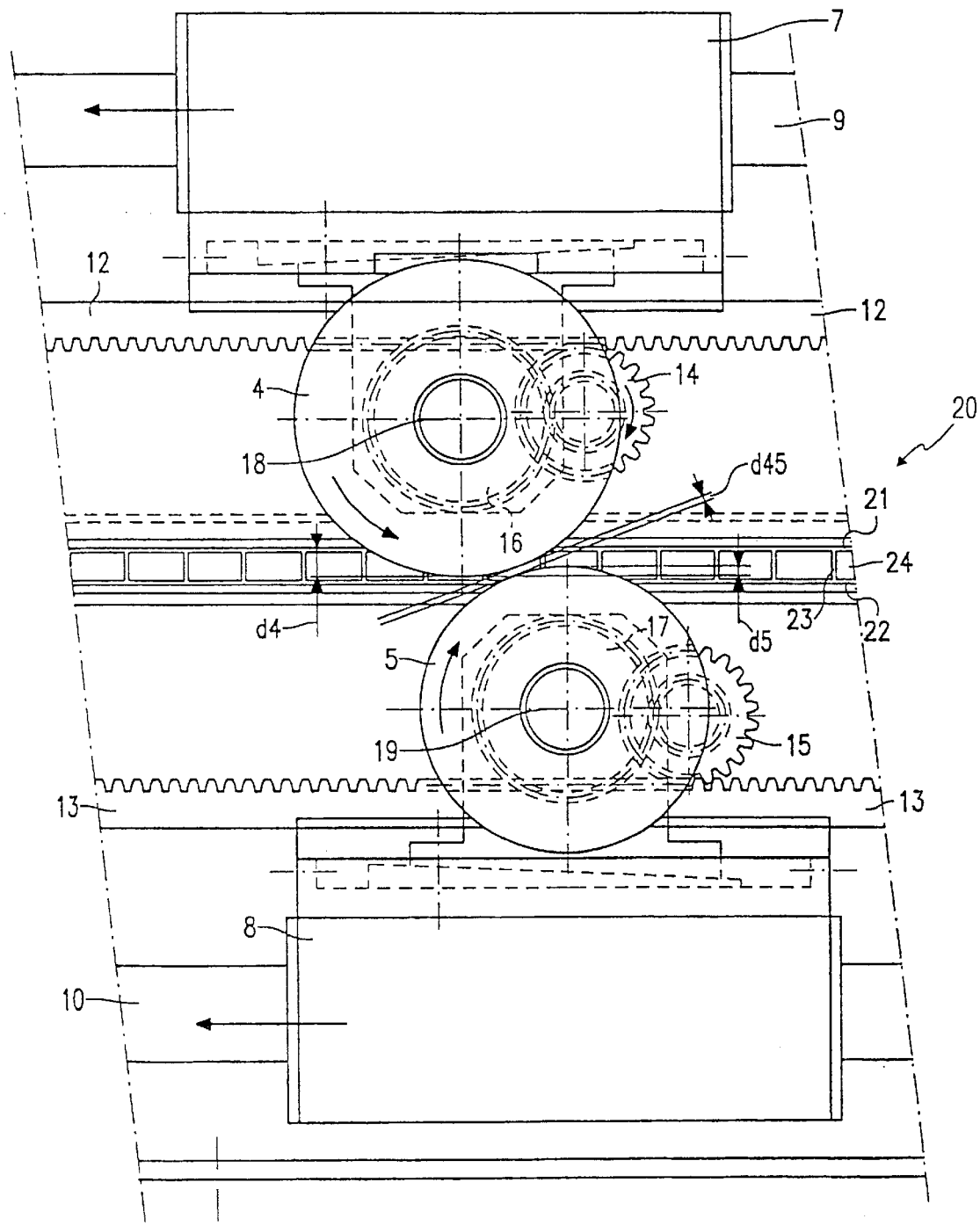
FIG. 3 shows a cross section in a direction transverse to FIG. 2.

An embodiment of a device according to the present invention is represented in FIGS. 1–3, showing the front view and two detailed cross sections, respectively. In this example the device includes a frame 1, on which means of fixation, in the form of table 2, are attached for the plate material to be processed. Table 2 includes a stop 3 underneath against which the plate material can be positioned, when in use. For shortening the plate material, the installation has been provided with two rotating knives 4, 5 placed opposite each other, which have been placed in a closed screening cap 6 for reasons of safety, which is the reason why they cannot be seen in FIG. 1. However, the interior of screening cap 6 has been drawn in more detail in the cross sections of FIG. 2 and 3.

Both knives 4, 5 have been installed on carriages 7, 8 respectively which both run on a linear guiding system 9, 10 attached to frame 1. This makes it possible to make dead straight cuts. Both carriages 9. 10 use screw windings which can be energized with motor 11 for their propulsion. For that matter, within the framework of the invention, it is possible to use other propelling agents for the carriages, for example pneumatic or hydraulic systems. When the carriages 7, 8 are moved over guiding system 9, 10 they both run along a gear rack 12, 13 which is in mesh with a toothed wheel 14, 15 hereafter to be referred to as an intermediate gear, which drives a toothed wheel 16, 17 placed on a shaft 18, 19 of one of the rotating knives 4, 5. This results in a transmission ratio of approximately 2:1 between gear racks 12, 13 and knives 4, 5; because of which the speed of rotation of the rotating knives is always 50% of the throughput speed over plate material 20. However, this ratio can be modified in practice, if desired, and be adapted to specific plate materials to realize an optimum effect. Thus, the friction between the plate material and the knives and therefore the electrostatic charging of the plate material can be limited.

Furthermore, the rotation of the knives safeguards, when in use, a straight clean cut and a minimal wear of the knives which guarantees a long standing time.

The device has especially been developed for shortening multilateral plate material 20 of at least two mostly parallel exterior plates 21, 22 which have been separated by means of a number of parallel dividing walls 23. Typically, plate material of this type has been manufactured with polycarbonate or other translucent synthetic material. The dividing walls 23 cover almost the entire length or width of the plate material, thus forming a number of elongated cavity channels 24 in the plate material which are responsible for its warmth insulating qualities. Compared with solid plate material, much more attention is to be paid to the pressure put on exterior plates 21, 22 when this type of plate material is used for shortening this material. Too much pressure will cause the dividing walls to deform or even collapse.

For shortening, plate material 20 is placed on table 2 and pushed against stop 3. To realize this the material is positioned in such a way that the desired cut is level with the rotating knives 4, 5, The table includes a number of parallel joists 25, 26 which extend from the right and from the left of rotating knives 4, 5 respectively, leaving together with stop 3 some space which gives free passage to knives 4, 5 see FIG. 2. When the place material is cut, the plate material is firmly pressed on table 2 using pressure devices shaped like two-jointed pressure beam 28. The pressure beam too is discontinued in the plane of intersection to give knives 4, 5 free passage. Because the table joists on the left 25 and on the right 26, as well as the parts of the pressure beam form a slight angle, the vertex of which lies in the plane of intersection, the plate material is slightly bent backwards causing a slight deviation near the plane of intersection. Thus, an intolerable friction with the plate material of especially upper knife 4, which almost completely penetrates the thickness of the plate material, is avoided.

Thus, possible levering or running of knife 4 in the plate material is adequately prevented. A slight angle is enough, in this respect, to realize satisfactory results, when thicker plate material is used, whereas too large a wedge in table top 2, for example of more than 10 degrees, would put an intolerable pressure on the plate material causing deformations. Possible levering of knives 4, 5 in plate material 20 is furthermore limited by shafts 18, 19 which are supported on bearings installed on the relevant carriage 7,8 which gives complete absence of play.

Because penetration depth d4 of the upper knife almost equals the thickness of the plate material and penetration depth d5 of the lower knife does not or hardly exceeds the thickness of lower exterior plate 22 and therefore only cuts through the "soul" of the plate material, the friction of this knife 5 with plate material 20 is limited. However, the cutting through with this knife 5 does provide the desired bevelled edge of the lower exterior plate 22 which avoids the possible tearing or breaking of an edge finishing.

Because both knives 4, 5 are, in accordance with the invention, placed slantwise behind each other, a situation is prevented in which the knives work into a similar line of normal force on the plate material limiting the total amount of pressure on dividing wall 23 and especially avoiding too much stress on the dividing walls. Furthermore, positioning knives 4, 5 in such a way offers the possibility of a combined penetration depth of both knives; this means that penetration depth d4 of the upper knife 4 is added to penetration depth d5 of the lower knife 5, which is only slightly deeper than the thickness of the plate material. This ensures a complete cut through plate material 20. At their outlines both knives 4, 5 are separated by a small margin d45 ensuring that the knives 4, 5 will never touch each other, which would cause premature wear of the knives.

Unlike in a situation in which the familiar installation for shortening plate material of this type is used, in which case the plate material is usually sawn mechanically, the knives 4, 5 will produce a small quantity of chips or none at all.

Because the friction and therefore the electrostatic charging of the plate material is, compared with the familiar installation, considerably limited, hardly any dirt or dust penetrates the cavity channels 24. Because of this, an additional step in the process which is to blow chips, dirt and dust out of the translucent cavity channels 24, as is necessary for the familiar installation, can, in accordance with the invention, be avoided for the installation.

In practice, the device described here has shown to be able to cut multilateral plate material varying in thickness and stacking satisfactorily to size using high throughput speed.

Although in the above paragraphs the invention has been explained on the basis of a few embodiment examples only, it is obvious that the invention is not at all restricted to these examples. On the contrary, within the framework of the invention there are many possible varieties and forms for an average craftsman. Thus, the upper knife can be installed adjustable in height in order to realize a cutting through of the plate material by repeated cuttings, which become deeper with every repetition. Impermissible friction of the knife with the plate material and impermissible stress on the material can thus be avoided to an even larger extent.

Furthermore, the invention can be supplemented with small stationary sliding knives, preferably placed on either side very close alongside both rotating knives. Protective tinfoil, if any, attached on the exterior plates, can be cut off where the plate material begins, making it possible to remove a small strip afterwards. The remaining tinfoil, however, is kept in place to keep on protecting the plate material until it has been installed with the end user. Thus, a small strip of plate material is uncovered just before the ease is typically finished with some tape. The attached tape sticks to lanes, typically 15 mms wide, which have been freely laid out on either side of the plate material, and thus in the same process track.

The pair of knives can be installed in a stationary version too so that the plate material can be put through in between them. In this case, an adequate stop of the plate material can promote a linear guidance causing dead straight cuts.

In general, the invention offers an installation of the type as referred to in the opening lines which avoids too much pressure because of a pair of knives with a specific position with respect to each other which makes it especially suitable for multilateral plate material, which plates are separated by relatively vulnerable dividing walls. However, the area of application of the installation is, in accordance with the invention, not restricted to the above-mentioned multilateral plate material. The installation can also be used for shortening solid plate material, within a certain thickness, and can especially be used, if, in accordance with the model version described above, installed with a wedge-shaped table top, for shortening foamed plate materials which can be cut excellently because of the wedge-shaped table top.

What is claimed is:

1. A device for cutting plate material, comprising two knives lying substantially in a common plane, a first of said knives being rotatable about a first axis and a second of said knives being rotatable about a second axis substantially parallel to the first axis, first support means on one side of said common plane for supporting the plate material, said support means defining a support plane which is substantially orthogonal to said common plane of said knives, both of said axes lying in a plane that forms an acute angle with said support plane said knives having outer peripheries which overlap each other when viewed in a direction generally perpendicular to said first and second axes and generally along said support plane, a second support means disposed on an opposite side of said common plane with respect to said first support means, each of said first and second support means having a respective support surface for supporting said plate material, said support surfaces forming a small angle with each other whose vertex is substantially in said common plane of said knives.

2. A device as claimed in claim 1, wherein said small angle does not exceed 10 degrees.

* * * * *